Nov. 5, 1946.                B. RONAY                2,410,461
         SUB-AQUEOUS ARC-WELDING AND CUTTING ELECTRODE
                     Filed April 5, 1944
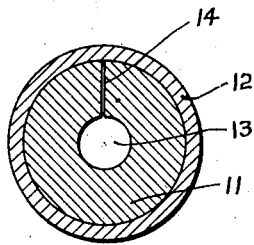
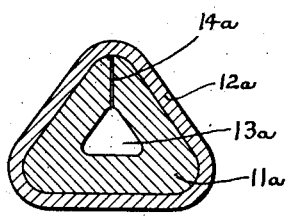
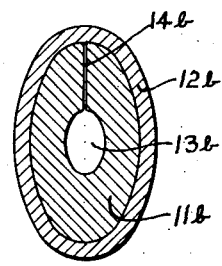
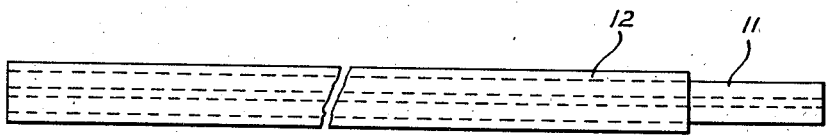
Bela Ronay.
INVENTOR
BY *W. Glenn Jones*
ATTORNEY Patented Nov. 5, 1946

2,410,461

UNITED STATES PATENT OFFICE 2,410,461

SUBAQUEOUS ARC-WELDING AND CUTTING ELECTRODE

Bela Ronay, Annapolis, Md.

Application April 5, 1944, Serial No. 529,605

7 Claims. (Cl. 219—8)

(Granted under the act of March 3, 1883, as amended April 30, 1928; 370 O. G. 757)

The present invention relates to an improved oxy-arc welding or cutting electrode, and, in particular, to an electrode adapted to be used in sub-aqueous welding or cutting and metal trimming operations.

Inasmuch as it is necessary to provide an underwater electrode of the oxy-arc type which has a water impervious coating provided with a central opening through which oxygen or other gases may be directed to the zone of operation, it has been the practice to provide an electrode having a core made from seamless tubing. It is evident therefore, that such an electrode is not only difficult to manufacture, involving numerous steps in the processing thereof, but is expensive, as well, since welded pipe which could be adapted for such uses is not now commercially produced.

It is an object of this invention to provide an improved underwater welding or cutting electrode which may be manufactured cheaply and expeditiously and yet have all of the qualities essential to an electrode of the type necessary for use in sub-aqueous operations.

Another object of this invention is to provide an oxy-arc underwater welding or cutting electrode having an open seam tubing core which is covered with a moisture impervious coating material.

A further object of this invention is to provide an electrode which, due to its cross-sectional shape, will actually result in a saving of metal by reason of the narrower kerf removed thereby when various cutting and metal trimming operations are performed.

These and other objects as well as the various other novel features and advantages of this invention will become apparent from a reading of the following specification and accompanying drawing of which:

Fig. 1 is an elevational view of the coated arc welding or cutting electrode, and;

Figs. 2, 3 and 4 are sectional views of electrodes having circular, triangular and elliptical cross-sections respectively.

With reference to Fig. 1, the underwater oxy-arc cutting electrode consists of the core 11 coated with a water impervious relatively non-combustible coating 12. Although the preferred material used in the manufacture of the core 11 is mild steel, it is obvious that, depending upon the operation to be performed, the core may be made from a material which is best adapted to be used for the particular purpose at hand. This core, being of an open seam tubular construction, is formed from a rectangular flat elongated strip, suitably bevelled at its edges, which is shaped in suitable dies or forming apparatus so that in the finished tubing the two bevelled edges will come into abutting or substantially abutting relationship.

It will be noted that in Fig. 2 the metallic core is formed into a circular cross-section, the central opening 13 being adapted to direct oxygen or other suitable gases from the torch in which the electrode is secured to the zone of operation. Although the seam 14, formed when the bevelled edges of the core are brought substantially together, is open so that the gas could normally escape therethrough when directed into the core opening 13, the coating 12 fashioned on the outside of the core prevents the escape thereof and also provides a suitable insulation for the electrode.

The coating 12 is manufactured from a waterproof paper, cloth or fabricated glass saturated with a suitable waterproof organic material. The organic substance may be of a thermosetting resin, well known in the art, which has a characteristic of being insoluble in water, making its use most advantageous in the coating of underwater electrodes. In the accordance with the practices which are well known in the art, such coating may be applied by any one of a number of processes, namely, by wrapping with paper, cloth or glass fabric and dipping the covered electrode into the substance with which the applied wrappings are to be impregnated, by extrusion of the coating directly onto the core, or by preforming the coating into the shape of a sleeve and slipping it over the metallic core. This type of coating has a somewhat slower rate of consumption than the core 11 itself so that a suitable crater is formed immediately at the zone of operation, thus concentrating the heat into a very limited zone and preventing undesirable spreading of the arc. The triangular as well as the elliptical shaped electrodes illustrated in Figs. 3 and 4, are manufactured of the same or similar materials used in the construction of the circular type electrodes and the corresponding parts thereof indicated by the same numerals but with subscripts $a$ and $b$ respectively.

Due to the fact that the operator is often required to perform certain welding, cutting or trimming operations in restricted zones, the triangular or elliptical shaped electrode may be more readily adapted for such use than the circular type. The elliptical electrode, in addition, is most readily adapted for performing straight cutting operations inasmuch as a narrower kerf is removed thus resulting in a saving of metal, a higher cutting rate and a lower burn-off rate of the electrode.

It will be understood that the above description and accompanying drawing, comprehend only the general and preferred embodiment of the invention and that various changes in construction, proportion and arrangement of the parts may be made within the scope of the appended claims without sacrificing any of the advantages of the invention. Although the electrode has been defined as an oxy-arc electrode, it will be appreciated that the term "oxy-arc" is not to be considered as a limitation but rather as a general descriptive term including all types of gases which may be adapted for electrical arc welding or for electrical arc metal cutting operations.

The invention described herein may be manufactured and used by or for the Government of the United States of America for governmental purposes without the payment of any royalties thereon or therefor.

I claim:

1. A hollow welding or cutting electrode, through which a gas under pressure may be directed to the forward open end thereof, consisting of an open seam tubular core enclosed in and sealed along its length by a moisture impervious insoluble coating, said coating being adapted to be disintegrated at a lower rate of speed than that of said electrode core thereby insuring the formation of a crater at the end of the rod adjacent the zone of operation.

2. A hollow welding or cutting electrode, through which a gas under pressure may be directed to the forward open end thereof, consisting of a hollow open seam metallic core of a circular cross-sectional area covered with and sealed along its length by a moisture impervious insoluble coating, said coating being adapted to be disintegrated at a lower rate of speed than that of said electrode core thereby insuring the formation of a crater at the end of the rod adjacent the zone of operation.

3. A hollow welding or cutting electrode, through which a gas under pressure may be directed to the forward open end thereof, consisting of a hollow open seam metallic core of a triangular cross-sectional area covered with and sealed along its length by a moisture impervious insoluble coating, said coating being adapted to be disintegrated at a lower rate of speed than that of said electrode core thereby insuring the formation of a crater at the end of the rod adjacent the zone of operation.

4. A hollow welding or cutting electrode, through which a gas under pressure may be directed to the forward open end thereof, consisting of a hollow open seam metallic core of an elliptical cross-sectional area covered with and sealed along its length by a moisture impervious insoluble coating, said coating being adapted to be disintegrated at a lower rate of speed than that of said electrode core thereby insuring the formation of a crater at the end of the rod adjacent the zone of operation.

5. A hollow welding or cutting electrode, through which a gas under pressure may be directed to the forward open end thereof, having an open seam tubular metallic core coated and sealed for a substantial part of its length with a moisture impervious coating consisting of a paper base impregnated with a relatively non-combustible moisture impervious insoluble organic substance, said coating being adapted to be disintegrated at a lower rate of speed than that of said electrode core thereby insuring the formation of a crater at the end of the rod adjacent the zone of operation.

6. A method of forming a welding or cutting electrode comprising shaping a substantially rectangular flat elongated metallic strip into a tubular form so that the confronting edges are in substantially abutting relationship and coating and sealing along the seam the thus formed tubular member with a moisture impervious insoluble relatively non-combustible material, said coating being adapted to be disintegrated at a lower rate of speed than that of said electrode core thereby insuring the formation of a crater at the end of the rod adjacent the zone of operation.

7. A hollow welding or cutting electrode, through which a gas under pressure may be directed to the forward open end thereof, having an open seam tubular metallic core coated and sealed for a substantial part of its length with a moisture impervious coating consisting of a fabric base impregnated with a relatively non-combustible moisture proof insoluble organic substance, said coating being adapted to be disintegrated at a lower rate of speed than that of said electrode core thereby insuring the formation of a crater at the end of the rod adjacent the zone of operation.

BELA RONAY.